US012687892B2

(12) United States Patent
Kim et al.

(10) Patent No.: US 12,687,892 B2
(45) Date of Patent: Jul. 21, 2026

(54) DISPLAY DEVICE AND PANEL STORAGE CONTAINER

(71) Applicant: Samsung Display Co., LTD., Yongin-si (KR)

(72) Inventors: Tae Chang Kim, Yongin-si (KR); Tae Hoon Yang, Yongin-si (KR)

(73) Assignee: SAMSUNG DISPLAY CO., LTD., Yongin-si (KR)

( * ) Notice: Subject to any disclaimer, the term of this patent is extended or adjusted under 35 U.S.C. 154(b) by 406 days.

(21) Appl. No.: 18/333,707

(22) Filed: Jun. 13, 2023

(65) Prior Publication Data

US 2024/0126343 A1     Apr. 18, 2024

(30) Foreign Application Priority Data

Oct. 12, 2022     (KR) ........................ 10-2022-0130580

(51) Int. Cl.
*G06F 1/16*          (2006.01)
(52) U.S. Cl.
CPC .......... *G06F 1/1656* (2013.01); *G06F 1/1624* (2013.01); *G06F 1/1652* (2013.01)
(58) Field of Classification Search
CPC ..... G06F 1/1656; G06F 1/1624; G06F 1/1652
USPC ......................................................... 428/98
See application file for complete search history.

(56) References Cited

U.S. PATENT DOCUMENTS 11,508,268 B2 * 11/2022 Lee ........................ G06F 1/1641
12,248,336 B2 * 3/2025 Lee ........................ G06F 1/1656

| 2018/0103552 | A1 * | 4/2018 | Seo ........................ G09F 9/301 |
| 2022/0093012 | A1 * | 3/2022 | Lee ........................ G06F 1/1616 |
| 2023/0176614 | A1 * | 6/2023 | Kim ........................ G06F 1/1624 |
| 2023/0350462 | A1 * | 11/2023 | Jung ................... H04M 1/0268 |

FOREIGN PATENT DOCUMENTS

| KR | 10-2008-0028252 | 3/2008 | |
| KR | 10-2021-0130299 | 11/2021 | |
| KR | 20210130299 A * | 11/2021 | ........... G06F 1/1656 |
| KR | 10-2022-0076252 | 6/2022 | |
| KR | 20220076252 A * | 6/2022 | ........... G06F 1/1628 |

OTHER PUBLICATIONS

Machine_english_translation_KR_20220076252_A; Yang; Electronic Device Including flexible Display; Jun. 8, 2022; EPO; whole document (Year: 2025).*

* cited by examiner

*Primary Examiner* — Tahseen Khan
(74) *Attorney, Agent, or Firm* — F. CHAU & ASSOCIATES, LLC

(57)          ABSTRACT

A display device and a panel storage container are provided. The display device includes a display panel including a flat area and a bendable area disposed on a side of the flat area; and a storage container storing the bendable area of the display panel. The bendable area includes an active area having a side adjacent to the flat area, a dummy bending area disposed on another side of the active area, and a dummy flat area disposed on a side of the dummy bending area opposite to the active area. The dummy bending area is interposed between the active area and the dummy flat area, at least a portion of the bendable area is bent with a radius of curvature in the storage container, and a length of the dummy bending area is greater than a length of a portion of which the bendable area is bent.

10 Claims, 11 Drawing Sheets

DA : DA1
RA : RA1, RA2
SD : SD1, SD2, SD3
SD1 : SD1a, SD1b

DA : DA1, DA2, DA3
RA : RA1, RA2
SD : SD1, SD2, SD3
SD1 : SD1a, SD1b

1

CB

DM1    BZ                DC
                        SBA                    DM2

AA2        AA1        AA3

BZ

DR3
DR1
DR2

PNL : AA, NAA, SBA
AA : AA1, AA2, AA3
NAA : DM, BZ
DM : DM1, DM2

PNL : AA, NAA, SBA
AA : AA1, AA2, AA3
NAA : DM, BZ
DM : DM1, DM2
DM1 : DM1a, DM1b
DM2 : DM2a, DM2b
SP : SG, MPL, SPL

DR3

DR1 — ⊙
        DR2

AA : AA1, AA2, AA3
SP : SG, MPL

PNL : AA, NAA, SBA
AA : AA1, AA2, AA3
NAA : DM1, DM2, BZ
DM1 : DM1a, DM1b
DM2 : DM2a, DM2b
SP : SG, MPL, SPL
RA : RA1, RA2

SD2 : SD2a, SD2b
DM1 : DM1a, DM1b

SD2 : SD2a, SD2b
DM1' : DM1a, DM1b'

SD2 : SD2a, SD2b
DM1_1 : DM1a_1, DM1b

DISPLAY DEVICE AND PANEL STORAGE CONTAINER

CROSS REFERENCE TO RELATED APPLICATION(S)

This application claims priority to and the benefits of Korean Patent Application No. 10-2022-0130580 under 35 U.S.C. § 119, filed on Oct. 12, 2022, in the Korean Intellectual Property Office (KIPO), the entire contents of which are incorporated herein by reference.

BACKGROUND

1. Technical Field

The disclosure relates to a display device and a panel storage container.

2. Description of the Related Art

Importance of a display device is increasing with the development of multimedia. Accordingly, various types of display devices such as an organic light emitting display (OLED), a liquid crystal display (LCD), and the like are being used.

The display device includes a display panel such as an organic light emitting display panel, a liquid crystal display panel, or the like as a device for displaying an image of the display device. An example of the light emitting display panel among the display panels may include a light emitting element such as a light emitting diode (LED), and examples of such a light emitting diode include an organic light emitting diode (OLED) that uses an organic material as a fluorescent material, an inorganic light emitting diode that uses an inorganic material as a fluorescent material, and the like.

In recent years, with the development of display technology, research and development of a display device having a flexible display are being actively conducted. The flexible display may extend or reduce a display area, for example, fold, bend, or slide the display screen, thereby significantly contributing to a decrease in volume or a change in design of the display device.

SUMMARY

Aspects of the disclosure provide a display device capable of improving lighting efficiency of pixels.

Aspects of the disclosure also provide a method for manufacturing a display device capable of improving lighting efficiency of pixels.

An embodiment of a display device may include a display panel including a flat area and a bendable area disposed on a side of the flat area; and a storage container storing the bendable area of the display panel. The bendable area may include an active area having a side adjacent to the flat area, a dummy bending area disposed on another side of the active area, and a dummy flat area disposed on a side of the dummy bending area opposite to the active area. The dummy bending area may be interposed between the active area and the dummy flat area, at least a portion of the bendable area may be bent with a radius of curvature in the storage container, and a length of the dummy bending area may be greater than a length of a portion in which the bendable area is bent.

The bendable area may be bendable with respect to an axis.

In a state in which the display panel has a maximum display area, the portion of which the bendable area is bent may include the dummy bending area.

In the state in which the display panel has the maximum display area, the dummy flat area may be flat, and a length of the dummy flat area may be greater than or equal to about 4 mm.

The storage container may include a cover portion covering an entirety of the portion of which the bendable area is bent, and in the state in which the display panel is slid to the maximum, at least a portion of the dummy bending area may be exposed from the cover portion.

The portion of which the bendable area is bent may be bent about 180°, and the length of the dummy bending area may be equal to or greater than a value obtained by multiplying the radius of curvature by a value of $\pi$.

In a state in which the display panel has a maximum display area, the portion of which the bendable area is bent may include a portion of the dummy bending area and a portion of the active area.

The storage container may include a cover portion partially exposing the portion of which the bendable area is bent, and in the state in which the display panel is slid to the maximum, at least a portion of the dummy bending area may be exposed from the cover portion.

The portion of which the bendable area is bent may be bent about 180°, the cover portion may cover about half of the portion of which the bendable area is bent, and the length of the dummy bending area may be equal to or greater than a value obtained by multiplying the radius of curvature by a value of $\pi/2$.

In the state in which the display panel has the maximum display area, the dummy flat area may be flat, and a length of the dummy flat area may be greater than or equal to about 4 mm.

According to an embodiment of the disclosure, a display device may include a display panel including a first area and a second area disposed on a side of the first area in a first direction and bendable with respect to an axis, a first storage container storing the first area of the display panel, and a second storage container storing the second area of the display panel and slidable from the first storage container in the first direction to guide a sliding operation of the display device. The second area may include: a first active area having a side adjacent to the first area, a first dummy bending area disposed on another side of the first active area, and a first dummy flat area disposed on a side of the first dummy bending area opposite to the first active area. The first dummy bending area may be interposed between the first active area and the first dummy flat area, at least a portion of the second area may be bent with a radius of curvature in the second storage container, and a length of the first dummy bending area may be greater than a length of a portion of which the second area is bent.

In a state in which the display panel has a maximum display area, the portion of which the second area is bent may include the first dummy bending area.

In the state in which the display panel has the maximum display area, the first dummy flat area may be flat, and a length of the first dummy flat area may be greater than or equal to about 4 mm.

The second storage container may include a cover portion covering an entirety of the portion of which the second area of the display panel is bent, and in the state in which the display pane is slid to the maximum, at least a portion of the first dummy bending area may be exposed from the cover portion.

The portion of which the second area is bent may be bent about 180°, and the length of the first dummy bending area may be equal to or greater than a value obtained by multiplying the radius of curvature by a value of π.

The display panel may further include a third area disposed on another side of the first area in the first direction and bendable with respect to the axis, and the display device may further include a third storage container storing the third area of the display panel and slidable from the first storage container in the first direction to guide the sliding operation of the display device.

The display panel may further include a sub-area disposed on a side of the first area in a second direction intersecting the first direction.

The third area may include a second active area having a side adjacent to the first area, a second dummy bending area disposed on another side of the second active area, and a second dummy flat area disposed on the second dummy bending area opposite to the second active area. The second dummy bending area may be interposed between the second active area and the second dummy flat area, at least a portion of the third area may be bent with a radius of curvature in the third storage container, and a length of the second dummy bending area may be greater than a length of a portion of which the third area is bent.

In a state in which the display panel has a maximum display area, the portion of which the third area is bent may include the second dummy bending area.

In the state in which the display panel has the maximum display area, the second dummy flat area may be flat, and a length of the second dummy flat area may be greater than or equal to about 4 mm.

According to an embodiment of the disclosure, a panel storage container slidable in a first direction and storing a display panel including a flat area and a bendable area disposed on a side of the flat area, the panel storage container may include a first storage container, and a second storage container slidable from the first storage container in the first direction to guide a sliding operation of the display device. A portion of the bendable area of the display panel may be bent and stored in the second storage container. The bendable area of the display panel may include an active area having a side adjacent to the flat area, a dummy bending area disposed on another side of the active area, and a dummy flat area disposed on a side of the dummy bending area opposite to the active area. The dummy bending area may be interposed between the active area and the dummy flat area, the second storage container may include a cover portion covering a portion of which the display panel is bent, and in a state in which the display panel is expanded to a maximum, the cover portion of the second storage container may expose at least a portion of the dummy bending area.

The bendable area of the display panel may be bent about 180° with a radius of curvature in the second storage container, and the cover portion of the second storage container may cover an entirety of a portion of which the bendable area of the display panel is bent.

However, aspects of the disclosure are not restricted to those set forth herein. The above and other aspects of the disclosure will become more apparent to one of ordinary skilled in the art to which the disclosure pertains by referencing the detailed description of the disclosure given below.

The display device according to an embodiment may improve lighting efficiency of pixels.

The method for manufacturing a display device according to an embodiment may provide a display device capable of improving lighting efficiency of pixels.

However, the effects of the embodiments are not restricted to the one set forth herein. The above and other effects of the embodiments will become more apparent to one of ordinary skilled in the art to which the embodiments pertain by referencing the detailed description.

BRIEF DESCRIPTION OF THE DRAWINGS

The above and other aspects and features of the disclosure will become more apparent by describing in detail embodiments thereof with reference to the attached drawings, in which.

DETAILED DESCRIPTION OF THE EMBODIMENTS

Figure 1:
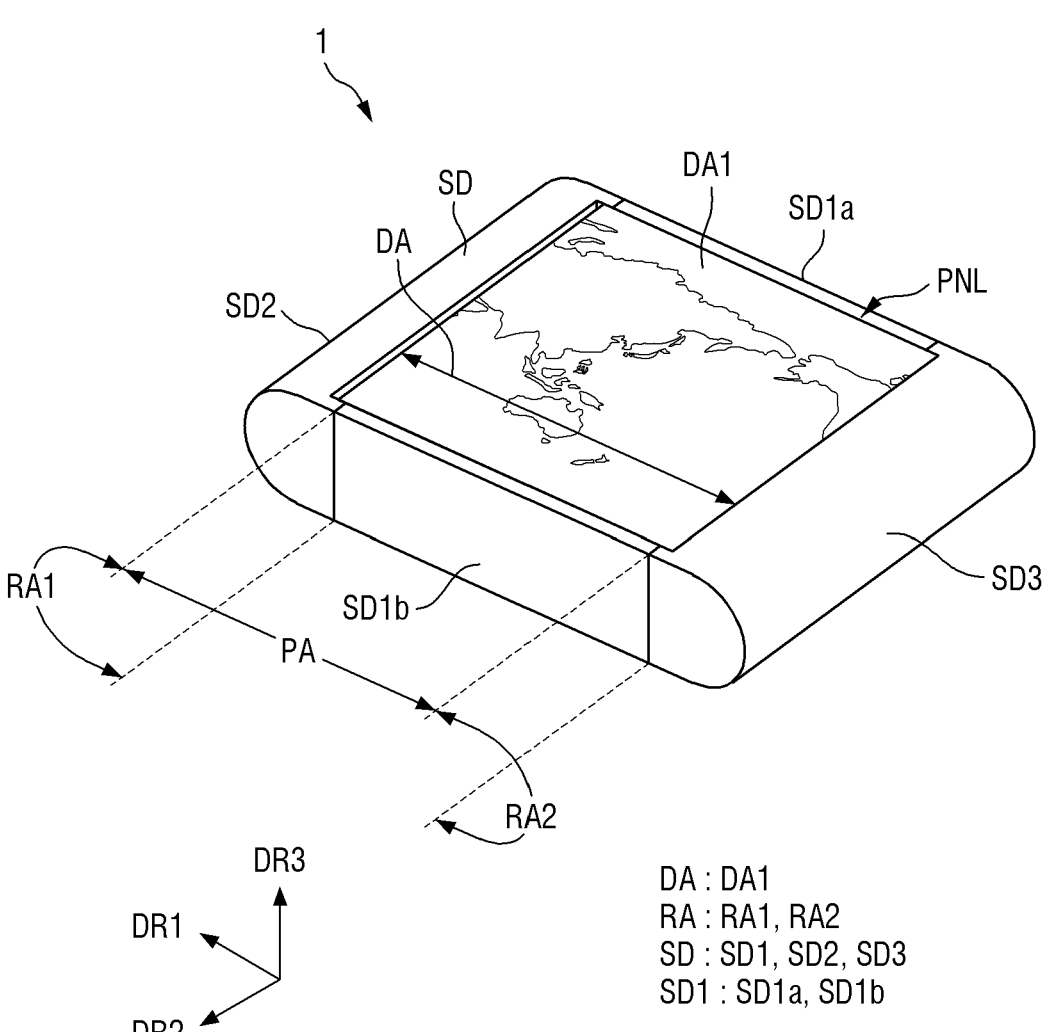
FIG. 1 is a schematic perspective view of a display device according to an embodiment.

In the following description, for the purposes of explanation, numerous specific details are set forth in order to provide a thorough understanding of various embodiments or implementations of the disclosure. As used herein "embodiments" and "implementations" are interchangeable words that are non-limiting examples of devices or methods disclosed herein. It is apparent, however, that various embodiments may be practiced without these specific details or with one or more equivalent arrangements. Here, various embodiments do not have to be exclusive nor limit the disclosure. For example, specific shapes, configurations, and characteristics of an embodiment may be used or implemented in another embodiment.

The embodiments will now be described more fully hereinafter with reference to the accompanying drawings, in which embodiments of the disclosure are shown. The disclosure may, however, be embodied in different forms and should not be construed as limited to the embodiments set forth herein. Rather, these embodiments are provided so that this disclosure will be more thorough and complete, and will fully convey the scope of the disclosure to those skilled in the art.

Unless otherwise specified, the illustrated embodiments are to be understood as providing example features of the disclosure. Therefore, unless otherwise specified, the features, components, modules, layers, films, panels, regions, and/or aspects, etc. (hereinafter individually or collectively referred to as "elements"), of the various embodiments may be otherwise combined, separated, interchanged, and/or rearranged without departing from the disclosure.

The use of cross-hatching and/or shading in the accompanying drawings is generally provided to clarify boundaries between adjacent elements. As such, neither the presence nor the absence of cross-hatching or shading conveys or indicates any preference or requirement for particular materials, material properties, dimensions, proportions, commonalities between illustrated elements, and/or any other characteristic, attribute, property, etc., of the elements, unless specified. Further, in the accompanying drawings, the size and relative sizes of elements may be exaggerated for clarity and/or descriptive purposes. When an embodiment may be implemented differently, a specific process order may be performed differently from the described order. For example, two consecutively described processes may be performed substantially at the same time or performed in an order opposite to the described order.

It will also be understood that when a layer is referred to as being "on" another layer or substrate, it can be directly on the other layer or substrate, or intervening layers may also be present. In contrast, when an element is referred to as being "directly on" another element, no intervening elements are present. The same reference numbers indicate the same components throughout the specification. Further, a first direction DR1, a second direction DR2, and a third direction DR3 are not limited to three axes of a rectangular coordinate system, such as the x, y, and z axes, and may be interpreted in a broader sense. For example, the first direction DR1, the second direction DR2, and the third direction DR3 may be perpendicular to one another, or may represent different directions that are not perpendicular to one another. For the purposes of this disclosure, "at least one of X, Y, and Z" and "at least one selected from the group consisting of X, Y, and Z" may be construed as X only, Y only, Z only, or any combination of two or more of X, Y, and Z, such as, for instance, XYZ, XYY, YZ, and ZZ. As used herein, the term "and/or" includes any and all combinations of one or more of the associated listed items.

The terminology used herein is for the purpose of describing particular embodiments and is not intended to be limiting. As used herein, the singular forms, "a," "an," and "the" are intended to include the plural forms as well, unless the context clearly indicates otherwise. Moreover, the terms "comprises," "comprising," "includes," and/or "including," when used in this specification, specify the presence of stated features, integers, steps, operations, elements, components, and/or groups thereof, but do not preclude the presence or addition of one or more other features, integers, steps, operations, elements, components, and/or groups thereof. It is also noted that, as used herein, the terms "substantially," "about," and other similar terms, are used as terms of approximation and not as terms of degree, and, as such, are utilized to account for inherent deviations in measured, calculated, and/or provided values that would be recognized by one of ordinary skill in the art.

Although the terms "first," "second," etc. may be used herein to describe various elements, these elements, should not be limited by these terms. These terms may be used to distinguish one element from another element. Thus, a first element discussed below may be termed a second element without departing from teachings of embodiments. The description of an element as a "first" element may not require or imply the presence of a second element or other elements. The terms "first," "second," etc. may also be used herein to differentiate different categories or sets of elements. For conciseness, the terms "first", "second", etc. may represent "first-category (or first-set)," "second-category (or second-set)," etc., respectively.

Throughout the specification, when an element is referred to as being "connected" to another element, the element may be "directly connected" to another element, or "electrically connected" to another element with one or more intervening elements interposed therebetween.

Unless otherwise defined or implied herein, all terms (including technical and scientific terms) used have the same meaning as commonly understood by those skilled in the art to which this disclosure pertains. It will be further understood that terms, such as those defined in commonly used dictionaries, should be interpreted as having a meaning that is consistent with their meaning in the context of the relevant art and should not be interpreted in an ideal or excessively formal sense unless clearly defined in the specification.

Hereinafter, specific embodiments will be described with reference to the accompanying drawings.

Figure 2:
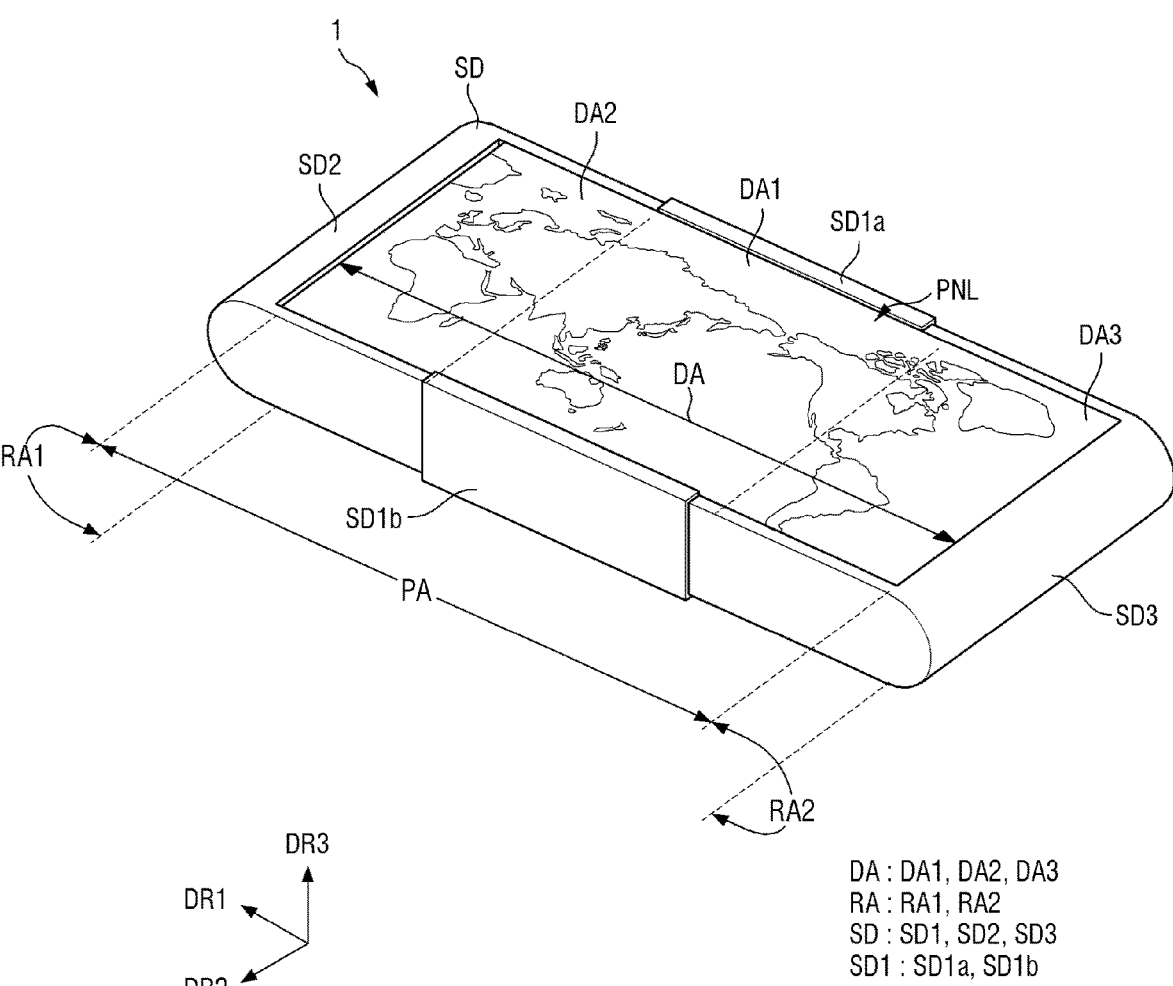
FIG. 2 is a schematic perspective view illustrating an expanded state of the display device according to an embodiment.

FIG. 1 is a schematic perspective view of a display device according to an embodiment. FIG. 2 is a schematic perspective view illustrating an expanded state of the display device according to an embodiment.

In FIG. 1, a first direction DR1, a second direction DR2, and a third direction DR3 are defined. The first direction DR1 and the second direction DR2 may be perpendicular to each other, the first direction DR1 and the third direction DR3 may be perpendicular to each other, and the second direction DR2 and the third direction DR3 may be perpendicular to each other. It may be understood that the first direction DR1 means a horizontal direction in the drawings, the second direction DR2 means a vertical direction in the drawings, and the third direction DR3 means upper and lower directions in the drawings, for example, a thickness direction.

In the following specification, unless otherwise specified, the term "direction" may refer to directions toward sides extending in the direction. In case that "directions" extending to sides need to be distinguished from each other, a side will be referred to as "a side in the direction" and another side will be referred to as "another side in the direction". In FIG. 1, a direction an arrow indicates is referred to as a side, and an opposite direction thereof is referred to as another side. However, it should be understood that the directions mentioned in the embodiments are relative directions, and the embodiments are not limited to the mentioned directions.

For convenience of explanation, in referring to surfaces of a display device 1 or each member constituting the display device 1, a surface facing a side in a direction on which an image is displayed, for example, in the third direction DR3 is referred to as a top surface, and an opposite surface of the top surface is referred to as a bottom surface. However, the disclosure is not limited thereto, and the top surface and the bottom surface of the member may be referred to as a front surface and a rear surface, respectively, or may be referred to as a first surface and a second surface. In describing a relative position of each member of the display device 1, a side in the third direction DR3 may be referred to as an upper side and another side in the third direction DR3 may be referred to as a lower side.

Referring to FIGS. 1 and 2, a display device 1 according to an embodiment may be a sliding display device or a slidable display device capable of sliding in the first direction DR1. The display device 1 according to an embodiment may be a multi-slidable display device that slides in both directions, but the disclosure is not limited thereto. For example, the display device 1 may be a single slidable display device that slides in only one direction. Hereinafter, the display device 1 according to an embodiment will be described as a multi-slidable display device.

The display device 1 may include a panel flat area PA (e.g., flat area) and a panel bending area RA (e.g., bendable area). The panel flat area PA of the display device 1 may substantially overlap an area exposing a display panel PNL of a panel storage container SD (e.g., storage container) to be described below in a plan view. The panel bending area RA of the display device 1 may be formed inside the panel storage container SD. The panel bending area RA may be bent with a radius of curvature (e.g., a predetermined or selectable radius of curvature), and may be an area in which the display panel PNL is bent according to the radius of curvature.

The panel bending area RA may be disposed on sides of the panel flat area PA in the first direction DR1. For example, a first panel bending area RA1 may be disposed on a side of the panel flat area PA in the first direction DR1, and a second panel bending area RA2 may be disposed on another side of the panel flat area PA in the first direction DR1.

The first panel bending area RA1 may be an area in which a second active area AA2 (e.g., active area) of the display panel PNL (see, e.g., FIG. 3), which will be described below, is bent. The second panel bending area RA2 may be an area in which a third active area AA3 of the display panel (see, e.g., FIG. 3), which will be described below, is bent.

As the display device 1 expands, an area of the panel flat area PA may increase as illustrated in FIG. 2. Accordingly, a distance between the first panel bending area RA1 and the second panel bending area RA2 may be increased.

Figure 3:
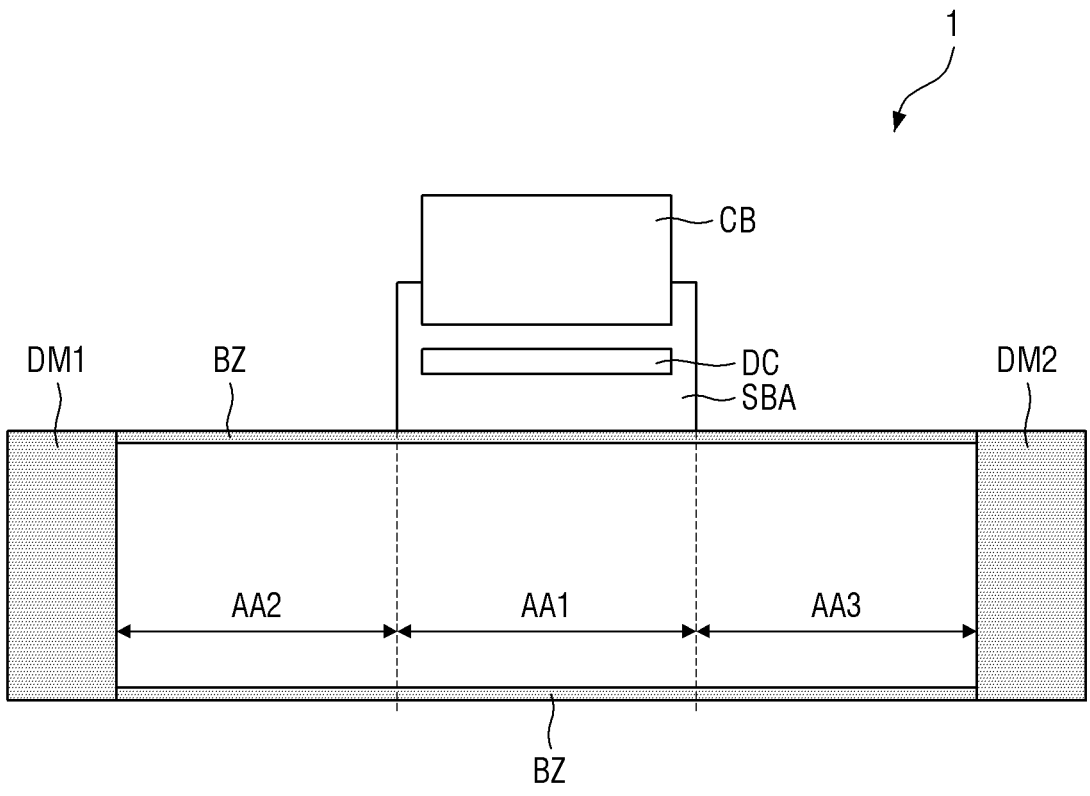
FIG. 3 is a schematic plan view of a display panel of the display device according to an embodiment.
Figure 3:
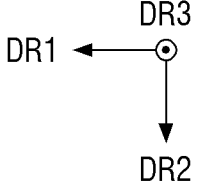
Figure 4:
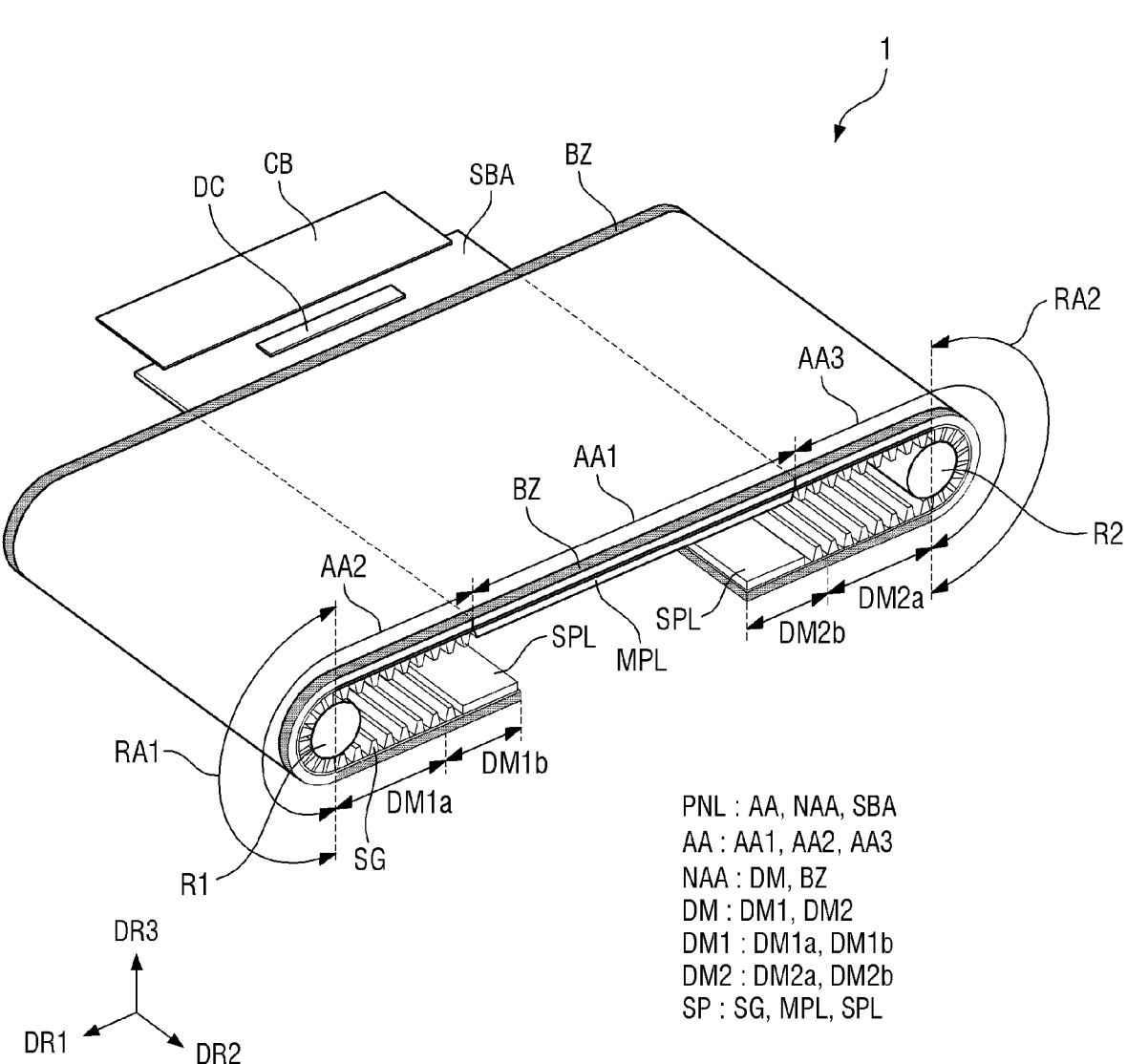
FIG. 4 is a schematic perspective view illustrating a structure of a display panel and a panel support of the display device according to an embodiment.
Figure 5:
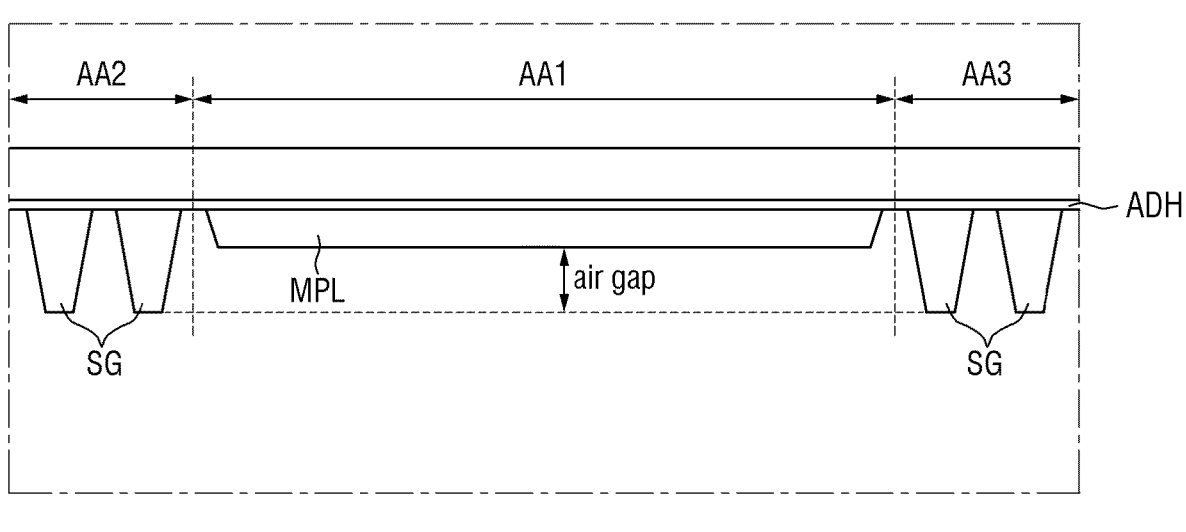
FIG. 5 is a schematic cross-sectional view illustrating the structure of the display panel and the panel support of the display device according to an embodiment.

FIG. 3 is a schematic plan view of a display panel of the display device according to an embodiment. FIG. 4 is a schematic perspective view illustrating a structure of a display panel and a panel support of the display device according to an embodiment. FIG. 5 is a schematic cross-sectional view illustrating the structure of the display panel and the panel support of the display device according to an embodiment. FIG. 4 illustrates a state in which the display device 1 is expanded but not fully expanded.

Referring to FIGS. 3 to 5 together with FIGS. 1 and 2, the display device 1 according to an embodiment may include a display panel PNL, a panel support SP, and a panel storage container SD.

The display panel PNL may be a panel including multiple pixels and displaying an image, and any type of display panel such as an organic light emitting display panel including an organic light emitting layer, a micro light emitting diode (LED) display panel using a micro light emitting diode, a quantum dot light emitting display panel using a quantum dot light emitting diode including a quantum dot light emitting layer, an inorganic light emitting display panel using an inorganic light emitting element including an inorganic semiconductor, and the like may be applied as the display panel PNL according to the embodiment.

The display panel PNL may be a flexible panel. The display panel PNL may have flexibility to be partially rolled, bent, or curved in the panel storage container SD as will be described below. The display panel PNL may be bendable with respect to the second direction DR2 axis.

The display panel PNL may include an active area AA and a non-active area NAA.

The active area AA of the display panel PNL may be an area in which multiple pixels are disposed. The active area AA may include a first active area AA1 supported by a main plate MPL to be described below, a second active area AA2 supported by multiple segment bodies SG, and a third active area AA3 supported by multiple segment bodies SG.

The first active area AA1 of the display panel PNL may be always a flat area maintaining a flat shape regardless of a sliding operation (of the display device 1). The second active area AA2 and the third active area AA3 of the display panel PNL may be rolled, bent, or curved, or may be a bending area or a bendable area in which a rolled, bent, or curved shape and a flat shape are changed according to the sliding operation of the display device 1. The second active area AA2 and the third active area AA3 of the display panel PNL may each be bent along rollers R1 and R2 to be described below.

A display area DA of the display panel PNL may be an area in which an image is displayed. The display area DA may be divided into a first display area DA1, a second display area DA2, and a third display area DA3 depending on a position of the display panel PNL.

The first display area DA1 may overlap the first active area AA1 of the display panel PNL in a plan view. The second display area DA2 may overlap at least a portion of the second active area AA2 of the display panel PNL in a plan view. The third display area DA3 may overlap at least a portion of the third active area AA3 of the display panel PNL in a plan view. For example, the second display area DA2 may be an area in which the second active area AA2 of the display panel PNL and the panel flat area PA overlap in a plan view, and the third display area DA3 may be an area in which the third active area AA3 of the display panel PNL and the panel flat area PA overlap in a plan view.

In an embodiment, a boundary between the first display area DA1 and the second display area DA2 may coincide with a boundary between the first active area AA1 and the second active area AA2, and may coincide with a boundary between the first active area AA1 and the third active area AA3, but the disclosure is not limited thereto.

A presence or absence of the second display area DA2 and the third display area DA3 and areas of the second display area DA2 and the third display area DA3 may vary depending on whether the display device 1 slides and the degree of sliding of the display device 1. In a non-sliding state, the display panel PNL may have the first display area DA1 having a first area. In a sliding state, the display area DA may further include the second display area DA2 and the third display area DA3 that are expanded, in addition to the first display area DA1.

The areas of the second display area DA2 and the third display area DA3 may vary according to the degree of sliding of the display device 1. For example, in case that the display device 1 is slid to the maximum, for example, in case that the display panel PNL has a maximum display area, the second display area DA2 may have a second area, the third display area DA3 may have a third area, and the display area DA may have a fourth area that is a sum of the first area, the second area, and the third area. The fourth area may be a maximum area that the display area DA may have.

The non-active area NAA of the display panel PNL may be an area in which an image is not displayed because no pixels are disposed. Metal wirings such as data/scan wirings, touch wirings, power voltage wirings, or the like may be disposed in the non-active area NAA. The non-active area NAA may be disposed adjacent to the active area AA. For example, the non-active area NAA may be disposed to surround the active area AA.

The non-active area NAA may include a bezel area BZ and a dummy area DM.

The bezel area BZ of the non-active area NAA may be disposed on both sides of the active area AA in the second direction DR2 as illustrated in FIG. 3. For example, the bezel area BZ may include a first bezel area disposed on a side of the active area AA in the second direction DR2, and a second bezel area disposed on another side of the active area AA in the second direction DR2.

The dummy area DM of the non-active area NAA may be disposed on both sides of the active area AA in the first direction DR1 as illustrated in FIG. 3. For example, the dummy area DM may include a first dummy area DM1 disposed on a side of the second active area AA2 in the first direction DR1, and a second dummy area DM2 disposed on another side of the third active area AA3 in the first direction DR1.

Metal wirings such as data/scan wirings, touch wirings, or the like may be disposed in the dummy area DM. Accordingly, since the metal wirings such as the scan/data wirings, the touch wirings, or the like are not disposed in the first bezel area and the second bezel area, an area of the active area AA may be increased by reducing areas of the first bezel area and the second bezel area.

At least a portion of the dummy area DM may be slid or bent according to a sliding operation of the display device 1.

For example, the first dummy area DM1 may include a first dummy bending area DM1a (e.g., dummy bending area) adjacent to the second active area AA2 and bendable, and a first dummy flat area DM1b (e.g., dummy flat area) having a flat profile. For example, the first dummy flat area DM1b may be flat. The first dummy flat area DM1b may be disposed opposite to the second active area AA2 with the first dummy bending area DM1a interposed between the second active area AA2 and the first dummy flat area DM1b in a state in which the display panel PNL is not bent and is fully unfolded in a plan view.

Similarly, the second dummy area DM2 may include a second dummy bending area DM2a adjacent to the third active area AA3 and bendable, and a second dummy flat area DM2b having a flat profile. For example, the second dummy flat area DM2b may be flat. The second dummy flat area DM2b may be disposed opposite to the third active area AA3 with the second dummy bending area DM2a interposed between the third active area AA3 and the second dummy flat area DM2b in a state in which the display panel PNL is not bent and is fully unfolded in a plan view.

The first dummy bending area DM1a and the second dummy bending area DM2a may be a bending area or a bendable area in which a rolled, bent, or curved shape and a flat shape are changed according to the sliding operation of the display device 1.

The first dummy flat area DM1b and the second dummy flat area DM2b may be always flat areas maintaining a flat shape regardless of the sliding operation of the display device 1. In case that the display panel PNL is expanded to the maximum, the first dummy flat area DM1b and the second dummy flat area DM2b may serve to alleviate a repulsive force generated in the display panel PNL. A description thereof will be provided below.

The display panel PNL may further include a sub-area SBA. The sub-area SBA may be disposed on the another side of the first active area AA1 of the display panel PNL in the second direction DR2. In other words, the sub-area SBA may protrude from the non-active area NAA toward the another side in the second direction DR2.

The sub-area SBA may overlap the first active area AA1 in the second direction DR2 and may not overlap the second active area AA2 and the third active area AA3 in the second direction DR2.

In an embodiment, the sub-area SBA may have a quadrangular planar shape, but the disclosure is not limited thereto. In an embodiment, a length of the sub-area SBA in the first direction DR1 and a length of the first active area AA1 in the first direction DR1 may be substantially the same, but the disclosure is not limited thereto. In another embodiment, the length of the sub-area SBA in the first direction DR1 may be less than the length of the first active area AA1 in the first direction DR1. A length of the sub-area SBA in the second direction DR2 may be less than a length of the first active area AA1 in the second direction DR2.

The sub-area SBA may be an area that is curved or bent. In case that the sub-area SBA is bent, the sub-area SBA may be disposed in a space formed by bending the second active area AA2 and the third active area AA3 of the display panel PNL and may overlap the first active area AA1 in the third direction DR3. With the above-described configuration, the display device 1 according to the embodiment may maximally secure an internal space while minimizing a thickness caused by bending the display panel PNL.

A driving circuit DC and a circuit board CB may be disposed on a surface of the sub-area SBA in the third direction DR3.

The circuit board CB may be attached onto a top surface of the sub-area SBA using an anisotropic conductive film (ACF). The circuit board CB may be electrically connected to a pad portion formed on the sub-area SBA. The circuit board CB may be a flexible film such as a flexible printed circuit board, a printed circuit board, a chip on film, or the like.

The driving circuit DC may be formed as an integrated circuit (IC) and be adhered onto the sub-area SBA in a chip on glass (COG) manner, a chip on plastic (COP) manner, an ultrasonic manner, or the like. In another embodiment, the driving circuit DC may be adhered onto the circuit board CB.

The panel support SP may serve to support a bottom surface of the display panel PNL. The panel support SP may be attached to the bottom surface of the display panel PNL to support the display panel PNL.

An adhesive ADH may be interposed between the panel support SP and the display panel PNL. In an embodiment, the adhesive ADH may be a pressure sensitive adhesive PSA, but the disclosure is not limited thereto. The panel support SP may include a main plate MPL, multiple segment bodies SG, and a sub-plate SPL.

The main plate MPL, the segment bodies SG, and the sub-plate SPL may have substantially the same relative positional relationship with respect to the display panel PNL. The sub-plate SPL may include a first sub-plate and a second sub-plate. For example, in case that the display panel PNL is unfolded to be flat without being bent, at least one plane parallel to the display panel PNL may be coplanar with the main plate MPL, the segment bodies SG, the first sub-plate, and the second sub-plate.

The main plate MPL may serve to support the first active area AA1 of the display panel PNL. The main plate MPL and the first active area AA1 of the display panel PNL may overlap in the third direction DR3. The main plate MPL may be disposed between the segment bodies SG supporting the second active area AA2 and the segment bodies SG supporting the third active area AA3.

The main plate MPL may have a planar shape extending in the first direction DR1 and the second direction DR2. In other words, the main plate MPL may have a substantially flat shape in a plan view. The main plate MPL may be disposed to have a constant thickness in the third direction DR3 along a profile of the first active area AA1 of the display panel PNL.

A surface of the main plate MPL in the third direction DR3 may be a top surface to which the first active area AA1 of the display panel PNL is attached, and another surface of the main plate MPL in the third direction DR3 may be a bottom surface on which an air gap to be described below is disposed.

The segment bodies SG may serve to support portions of the second active area AA2, the third active area AA3, and the dummy area DM of the display panel PNL. For example, the segment bodies SG may support the first dummy bending area DM1a of the first dummy area DM1 and the second dummy bending area DM2a of the second dummy area DM2.

The segment bodies SG may each extend in a thickness direction of the display panel PNL and may be arranged to be spaced apart from each other in a lateral (e.g., longitudinal) direction of the display panel PNL. Each of the segment bodies SG may have a thickness greater than the thickness of the main plate MPL in the thickness direction of the display panel PNL. Accordingly, an air gap may be formed on a lower surface of the main plate MPL as illustrated in FIG. 5. As the air gap is formed on the lower surface of the main plate MPL, a shock applied to the display panel PNL may be reduced. For example, in case that an object such as a user's pen or the like falls on the first active area AA1 of the display panel PNL, the air gap may absorb a shock resulting from the object's impact.

The sub-plate SPL may serve to support a portion of the dummy area DM. For example, the sub-plate SPL may support the first dummy flat area DM1b of the first dummy area DM1 and the second dummy flat area DM2b of the second dummy area DM2.

The sub-plate SPL may have a planar shape extending in the first direction DR1 and the second direction DR2, similarly to the main plate MPL. In other words, the sub-plate SPL may have a substantially flat shape in a plan view.

The rollers R1 and R2 may serve to assist a sliding operation of the display device 1. In an embodiment, the rollers R1 and R2 may have a cylindrical shape extending in the second direction DR2, and may rotate in a clockwise or counterclockwise direction based on a rotation axis parallel to the second direction DR2.

The rollers R1 and R2 may include a first roller R1 assisting a sliding operation (or bending operation) of the second active area AA2 of the display panel PNL and a second roller R2 assisting a sliding operation (or bending operation) of the third active area AA3 of the display panel PNL.

The segment bodies SG of the panel support SP supporting the bendable area of the display panel PNL may surround the rollers R1 and R2, and a bottom surface of the bendable area may be bent to surround the rollers R1 and R2. For example, as illustrated in FIG. 4, in a state in which the display device 1 is not fully expanded, the second active area AA2 as the bendable area of the display panel PNL may be bent about 180° to surround the first roller R1, and the third active area AA3 may be bent about 180° to surround the second roller R2.

As illustrated in FIGS. 1 and 2, the panel storage container SD may serve to store at least a portion of the display panel PNL and assist the sliding operation of the display device 1.

The panel storage container SD may include a first storage container SD1 positioned at a center of the display device 1, a second storage container SD2 disposed on a side of the first storage container SD1 in the first direction DR1 and including the first panel bending area RA1, and a third storage container SD3 disposed on another side of the first storage container SD1 in the first direction DR1 and including the second panel bending area RA2.

The first storage container SD1 may store the first active area AA1 of the display panel PNL and the bezel area BZ disposed adjacent to the first active area AA1. The sub-area SBA of the display panel PNL may be bent and disposed in the first storage container SD1.

The first storage container SD1 may connect the second storage container SD2 and the third storage container SD3 to each other. The first storage container SD1 may include a first sidewall portion SD1a connecting another side of the second storage container SD2 in the second direction DR2 and another side of the third storage container SD3 in the second direction DR2, and a second sidewall portion SD1b connecting a side of the second storage container SD2 in the second direction DR2 and a side of the third storage container SD3 in the second direction DR2. The first sidewall portion SD1a and the second sidewall portion SD1b of the first storage container SD1 may be spaced apart from each other in the second direction DR2 to form an opening exposing the display panel PNL.

The second storage container SD2 may store the second active area AA2 and the first dummy area DM1, and the third storage container SD3 may store the third active area AA3 and the second dummy area DM2.

The second storage container SD2 and the third storage container SD3 may slide from the first storage container SD1 in the first direction DR1. For example, the second storage container SD2 may slide from the first storage container SD1 to a side in the first direction DR1, and the third storage container SD3 may slide from the first storage container SD1 to another side in the first direction DR1.

Guide rails (not illustrated) may be formed inside the second storage container SD2 and the third storage container SD3 to guide the sliding operation of the display device 1. For example, an end of the display panel PNL in the second direction DR2 may be engaged with the guide rails formed inside the second storage container SD2 and the third storage container SD3, so that the rolled, bent, or curved shape and the flat shape of the bendable area of the display panel PNL may be changed according to the sliding operations of the second storage container SD2 and the third storage container SD3.

In other words, as ends of the second active area AA2 and the first dummy area DM1 of the display panel PNL in the second direction DR2 are engaged with the guide rails formed in the second storage container SD2, and the second storage container SD2 slides from the first storage container SD1, the rolled, bent, or curved shape and the flat shape of the second active area AA2 and the first dummy bending area DM1$a$ as the bendable area may be changed. As ends of the third active area AA3 and the second dummy area DM2 of the display panel PNL in the second direction DR2 are engaged with the guide rails formed in the third storage container SD3, and the third storage container SD3 slides from the first storage container SD1, the rolled, bent, or curved shape and the flat shape of the third active area AA3 and the second dummy bending area DM2$a$ as the bendable area may be changed.

Hereinafter, an arrangement of the display panel PNL and the panel storage container SD in case that the display device 1 is fully expanded will be described.

Figure 6:
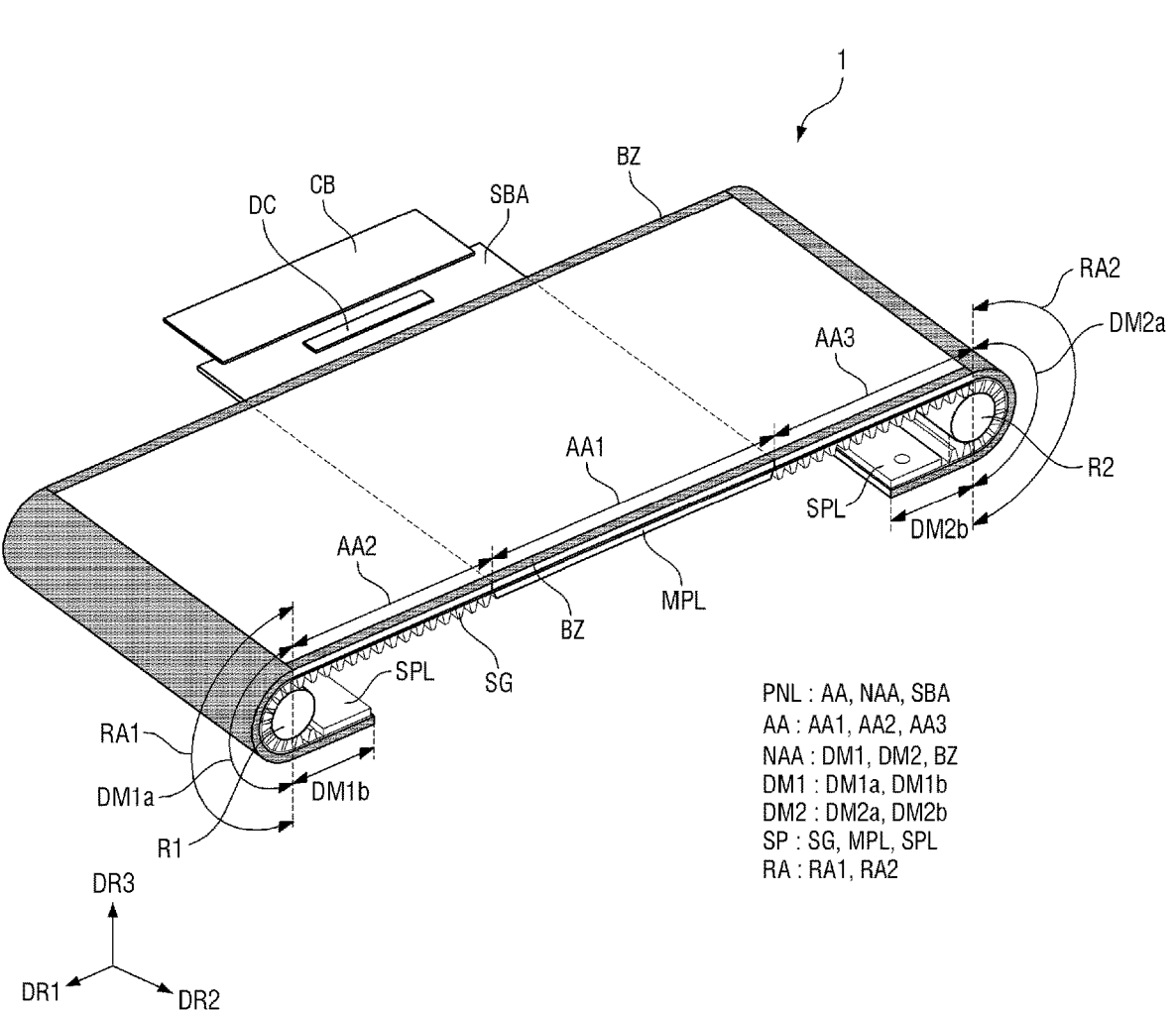
FIG. 6 is a schematic perspective view illustrating a structure of a display panel and a panel support in a state in which the display device according to an embodiment is expanded to a maximum.
Figure 7:
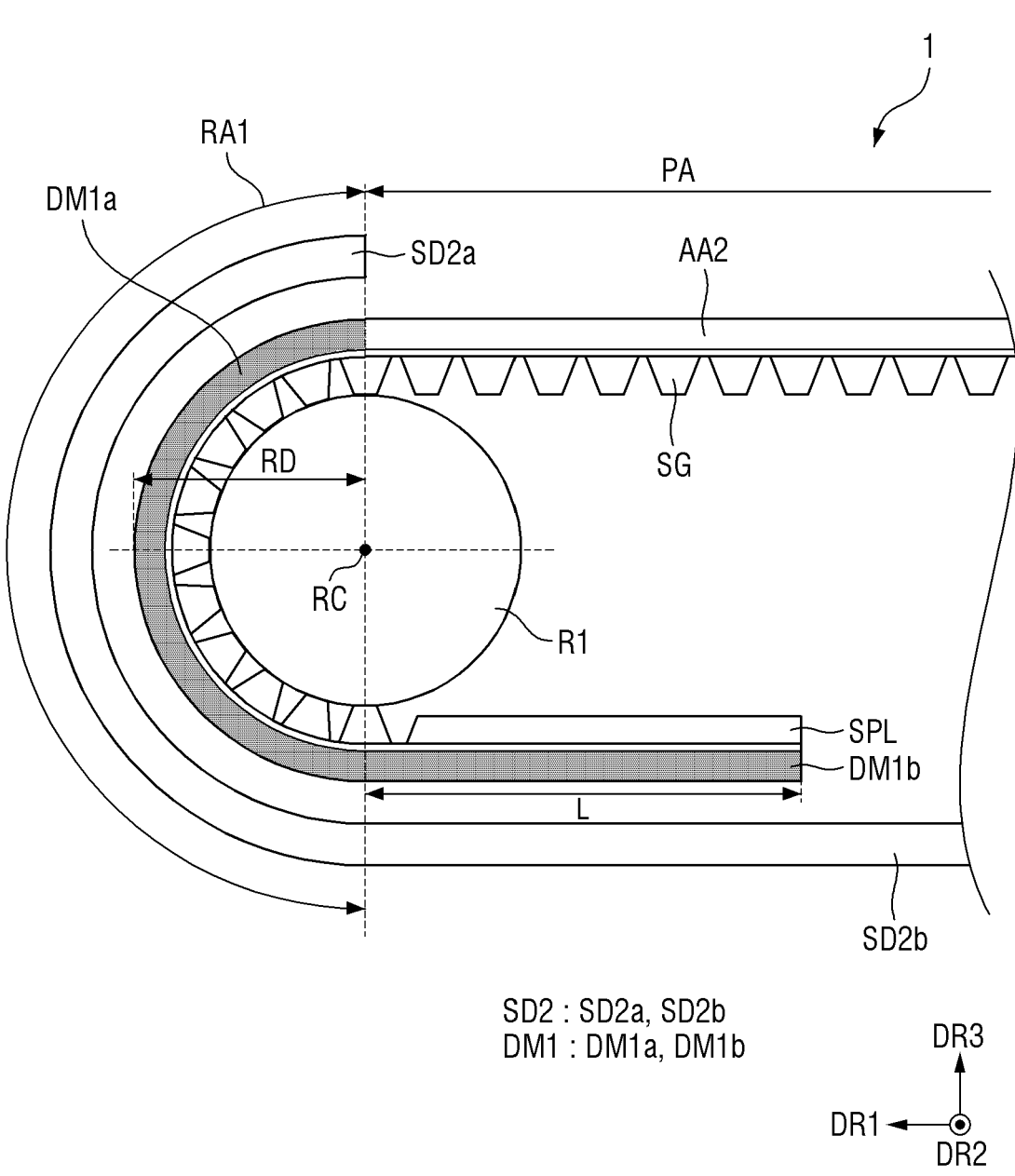
FIG. 7 is a schematic cross-sectional view illustrating an arrangement structure of a storage container and a display panel in a state in which the display device according to an embodiment is expanded to a maximum.

FIG. 6 is a schematic perspective view illustrating a structure of a display panel and a panel support in a state in which the display device according to an embodiment is expanded to a maximum. FIG. 7 is a schematic cross-sectional view illustrating an arrangement structure of a storage container and a display panel in a state in which the display device according to an embodiment is expanded to a maximum.

Referring to FIGS. 6 and 7, in case that the display device 1 according to an embodiment is expanded to the maximum, a bent portion of the display panel PNL in the panel bending area RA may include the first dummy bending area DM1$a$ and the second dummy bending area DM2$a$. For example, as the bendable area of the display panel PNL, the first dummy bending area DM1$a$ may be bent about 180° in the first panel bending area RA1 to surround the first roller R1, and the second dummy bending area DM2$a$ may be bent about 180° in the second panel bending area RA2 to surround the second roller R2.

In case that the display device 1 according to an embodiment is expanded to the maximum, an arrangement of the first dummy bending area DM1$a$ and the second storage container SD2 in the first panel bending area RA1 may be substantially the same as an arrangement of the second dummy bending area DM2$a$ and the third storage container SD3 in the second panel bending area RA2. Therefore, in the following, the arrangement of the first dummy bending area DM1$a$ and the second storage container SD2 in the first panel bending area RA1 will be described, and a detailed description of the arrangement of the second dummy bending area DM2$a$ and the third storage container SD3 in the second panel bending area RA2 will be omitted.

As described above, as the second active area AA2 and the first dummy area DM1 are stored in the second storage container SD2 and the second storage container SD2 slides, the rolled, bent, or curved shape and the flat shape of the second active area AA2 and the first dummy bending area DM1$a$ as the bendable area of the display panel PNL may be changed.

The second storage container SD2 may include a cover portion SD2$a$ that covers the first panel bending area RA1 and a bottom portion SD2$b$ that extends from the cover portion SD2$a$ and forms the bottom surface of the display device 1.

The cover portion SD2$a$ of the second storage container SD2 may define the panel flat area PA, for example, the display area DA by protecting a bent portion of the bendable area of the display panel PNL from an outside and exposing a portion of the bendable area of the display panel PNL that is not covered by the cover portion SD2$a$.

The cover portion SD2$a$ may follow the bent shape of the first panel bending area RA1. In other words, the cover portion SD2$a$ may have a shape bent about 180° while having a radius of curvature (e.g., a predetermined or selectable radius of curvature).

In an embodiment, the cover portion SD2$a$ may cover an entirety of the first panel bending area RA1, but the disclosure is not limited thereto. Hereinafter, for convenience of explanation, it will be described that the cover portion SD2$a$ covers the entirety of the first panel bending area RA1.

In case that the display device 1 according to an embodiment is expanded to the maximum, the first dummy bending area DM1$a$ of the display panel PNL may be bent in the first panel bending area RA1. For example, in case that the display device 1 is expanded to the maximum, the first dummy bending area DM1$a$ may be bent about 180° with respect to a center of curvature RC while having a radius of curvature RD (e.g., a predetermined or selectable radius of curvature RD). In other words, in case that the display device 1 is expanded to the maximum, the first dummy bending area DM1$a$ may cover about half of a circle forming the first roller R1 in a cross-sectional view as illustrated in FIG. 7. A length of the first dummy bending area DM1$a$ in a longitudinal direction of the display panel PNL or a circumferential direction of the roller R1 may have a value obtained by multiplying the radius of curvature RD (e.g., a predetermined or selectable radius of curvature RD) by a value of $\pi$.

In an embodiment, the center of curvature RC may match with a center of the first roller R1, but the disclosure is not limited thereto. It is illustrated in FIG. 7 that the center of curvature RC and the center of the first roller R1 match with each other.

With the above-described configuration, since it is the first dummy bending area DM1$a$ as the non-active area NAA in which the pixels are not disposed that contacts the second storage container SD2 even if a portion of the display panel PNL contacts the second storage container SD2 due to a lifting phenomenon of the display panel PNL caused by the sliding operation of the display device 1, it is possible to prevent the second active area AA2 in which the pixels are disposed from contacting the second storage container SD2 and being damaged.

Figure 8:
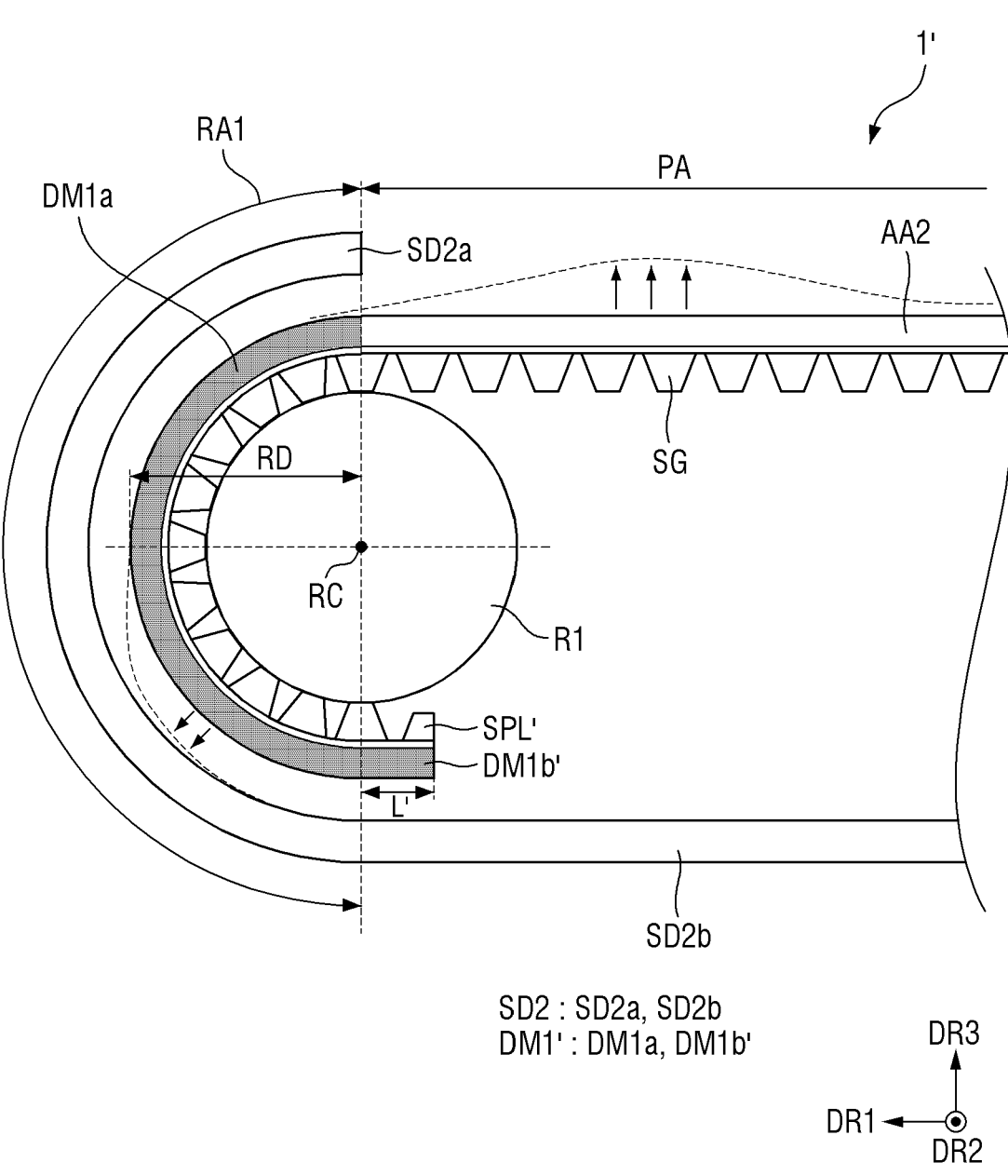
FIG. 8 is a schematic cross-sectional view illustrating an arrangement structure of a storage container and a display panel in a state in which a display device according to a comparative embodiment is expanded to a maximum.

FIG. 8 is a schematic cross-sectional view illustrating an arrangement structure of a storage container and a display panel in a state in which a display device according to a comparative embodiment is expanded to a maximum.

Referring to FIGS. 7 and 8, a display device 1' according to a comparative embodiment may be different from the display device 1 according to an embodiment in that a length L' of a first dummy flat area DM1$b'$ is less than the length L of the first dummy flat area DM1$b$ in the first direction DR1, and other configurations may be substantially the same or similar.

As illustrated in FIG. 8, in case that the length L' of the first dummy flat area DM1$b'$ in the first direction DR1 is relatively small in a state in which the display device 1' is expanded to the maximum, a repulsive force acting on the first dummy flat area DM1$b'$ may be increased, and thus a delamination phenomenon in which the first dummy area DM1' and the second active area AA2 are delaminated may be severe. Since a possibility that the second storage container SD2 and the display panel PNL contacting each other increases, which may damage the display panel PNL, it is necessary to prevent or at least alleviate the delamination phenomenon.

Accordingly, the delamination phenomenon of the first dummy area DM1 and the second active area AA2 may be prevented or at least alleviated by increasing the length L of the first dummy flat area DM1$b$ of the display device 1 according to the embodiment to reduce the repulsive force acting on the first dummy flat area DM1*b* as illustrated in FIG. 7.

In an embodiment, the length L of the first dummy flat area DM1*b* may be greater than or equal to about 4 mm. In case that the length L of the first dummy flat area DM1*b* is less than about 4 mm, the delamination phenomenon of the first dummy area DM1 and the second active area AA2 may not be alleviated.

Hereinafter, other embodiments of the display device 1 will be described. In the following embodiments, same components as those of the above-described embodiment will be denoted by same reference numerals, an overlapping description thereof will be omitted or simplified, and differences will be described.

Figure 9:
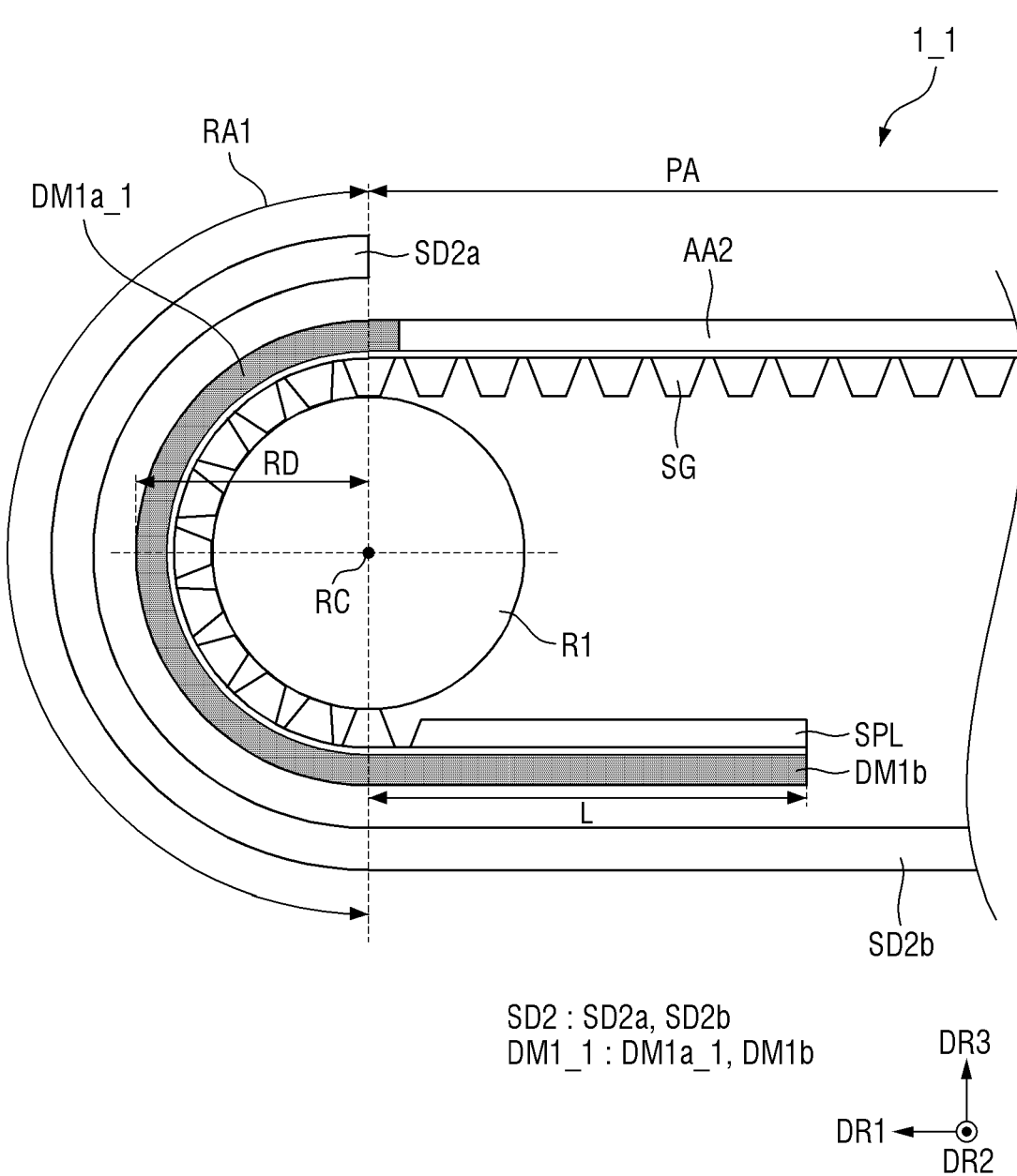
FIG. 9 is a schematic cross-sectional view illustrating an arrangement structure of a storage container and a display panel in a state in which a display device according to another embodiment is expanded to a maximum.

FIG. 9 is a schematic cross-sectional view illustrating an arrangement structure of a storage container and a display panel in a state in which a display device according to another embodiment is expanded to a maximum.

Referring to FIG. 9, a first dummy bending area DM1*a*_1 of a first dummy area DM1_1 may extend beyond the cover portion SD2*a* of the second storage container SD2 in a state in which a display device 1_1 according to the embodiment is expanded to the maximum.

The first dummy bending area DM1*a*_1 of the display device 1_1 according to the embodiment may be exposed from the cover portion SD2*a* of the second storage container SD2 and visually recognized to an outside. A length of the first dummy bending area DM1*a*_1 may be greater than a value obtained by multiplying a radius of curvature RD (e.g., a predetermined or selectable radius of curvature RD) by a value of π.

Accordingly, in the state in which the display device 1_1 is expanded to the maximum, a portion of the first dummy bending area DM1*a*_1 may overlap the panel flat area PA and have a flat profile, and a portion of the first dummy bending area DM1*a*_1 having the flat profile may face the first dummy flat area DM1*b* with the first roller R1 interposed between the first dummy flat area DM1*b* and the portion of the first dummy bending area DM1*a*_1.

With such a configuration, since the second active area AA2 of the display device 1_1 according to the embodiment may be further spaced apart from the second storage container SD2, a damage to the second active area AA2 by the second active area AA2 contacting the second storage container SD2 due to the delamination of the display panel PNL may be effectively prevented or at least alleviated.

Figure 10:
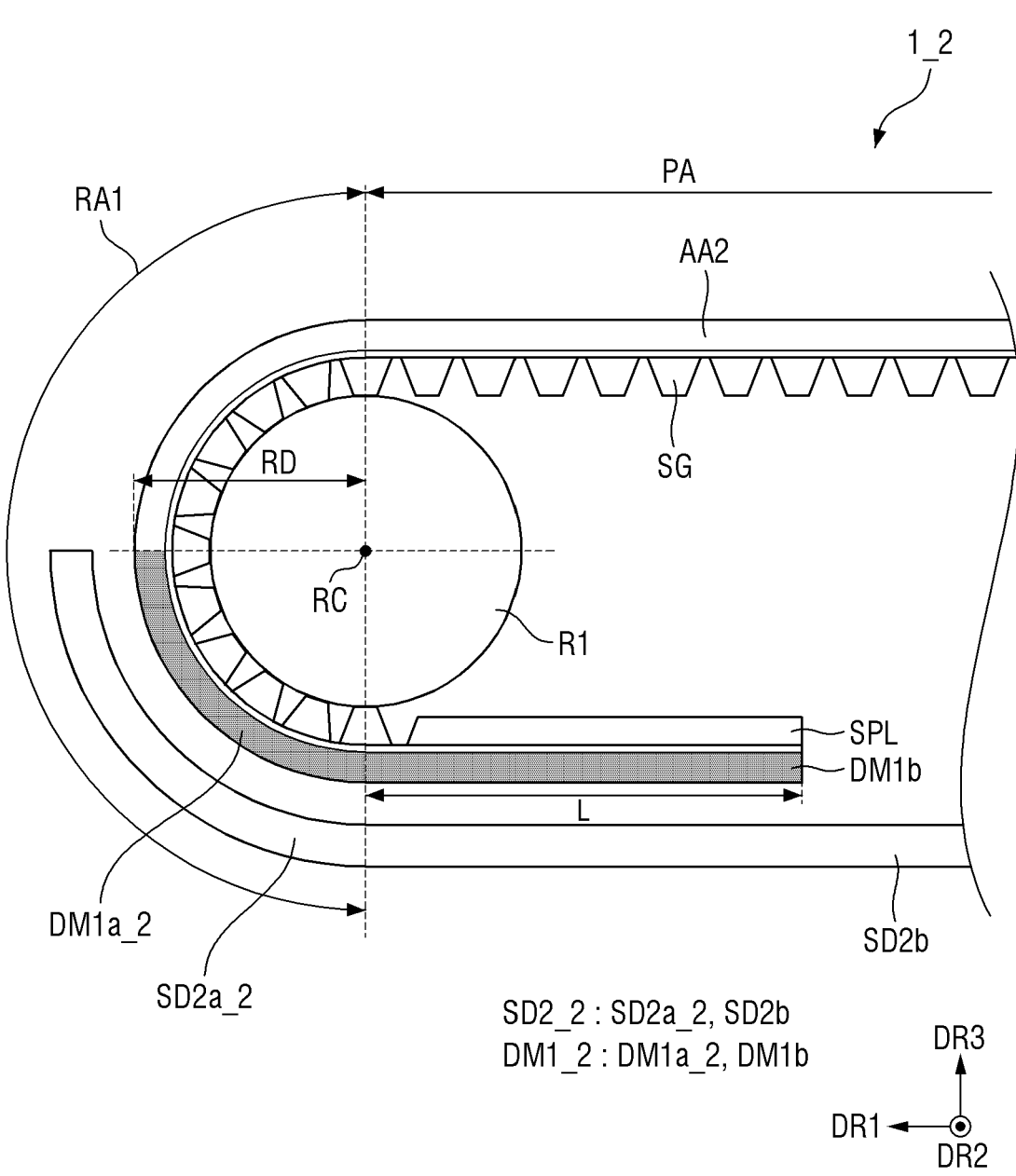
FIG. 10 is a schematic cross-sectional view illustrating an arrangement structure of a storage container and a display panel in a state in which a display device according to another embodiment is expanded to a maximum.

FIG. 10 is a schematic cross-sectional view illustrating an arrangement structure of a storage container and a display panel in a state in which a display device according to another embodiment is expanded to a maximum.

Referring to FIG. 10, a cover portion SD2*a*_2 of a second storage container SD2_2 of a display device 1_2 according to the embodiment may expose a portion of the first panel bending area RA1.

Although it is illustrated in FIG. 10 that the cover portion SD2*a*_2 of the second storage container SD2_2 covers about half of the first panel bending area RA1 and the cover portion SD2*a*_2 has a shape bent about 90° while having a radius of curvature (e.g., a predetermined or selectable radius of curvature), the disclosure is not limited thereto. For example, an angle at which the cover portion SD2*a*_2 is bent with a radius of curvature (e.g., a predetermined radius of curvature) is not particularly limited.

In case that the cover portion SD2*a*_2 has a shape bent about 90° while having the radius of curvature to cover about half of the first panel bending area RA1, the cover portion SD2*a*_2 may protect at least a portion of the display panel PNL to which bending stress is applied the most, for example, a portion overlapping from the center of curvature RC in the first direction DR1 from an outside. In other words, an end of the cover portion SD2*a*_2 of the second storage container SD2_2 of the display device 1_2 according to the embodiment may cover a portion of the display panel PNL to which the bending stress is applied the most by overlapping at least the center of curvature RC in the first direction DR1.

A length of the first dummy bending area DM1*a*_2 according to the embodiment may have a value obtained by multiplying a radius of curvature RD (e.g., a predetermined or selectable radius of curvature RD) by a value of π/2.

A portion of the display panel PNL of the display device 1_2 according to the embodiment bent in the first panel bending area RA1 may include a portion of the first dummy bending area DM1*a*_2 and a portion of the second active area AA2. A portion of the second active area AA2 of the display panel PNL of the display device 1_2 according to the embodiment bent in the first panel bending area RA1 may be exposed to an outside by the second storage container SD2_2 to display an image. Accordingly, the display area DA of the display device 1_2 may be expanded to not only the portion of the second active area AA2 in the panel flat area PA, but also the portion in the first panel bending area RA1 and is exposed by the second storage container SD2_2.

Figure 11:
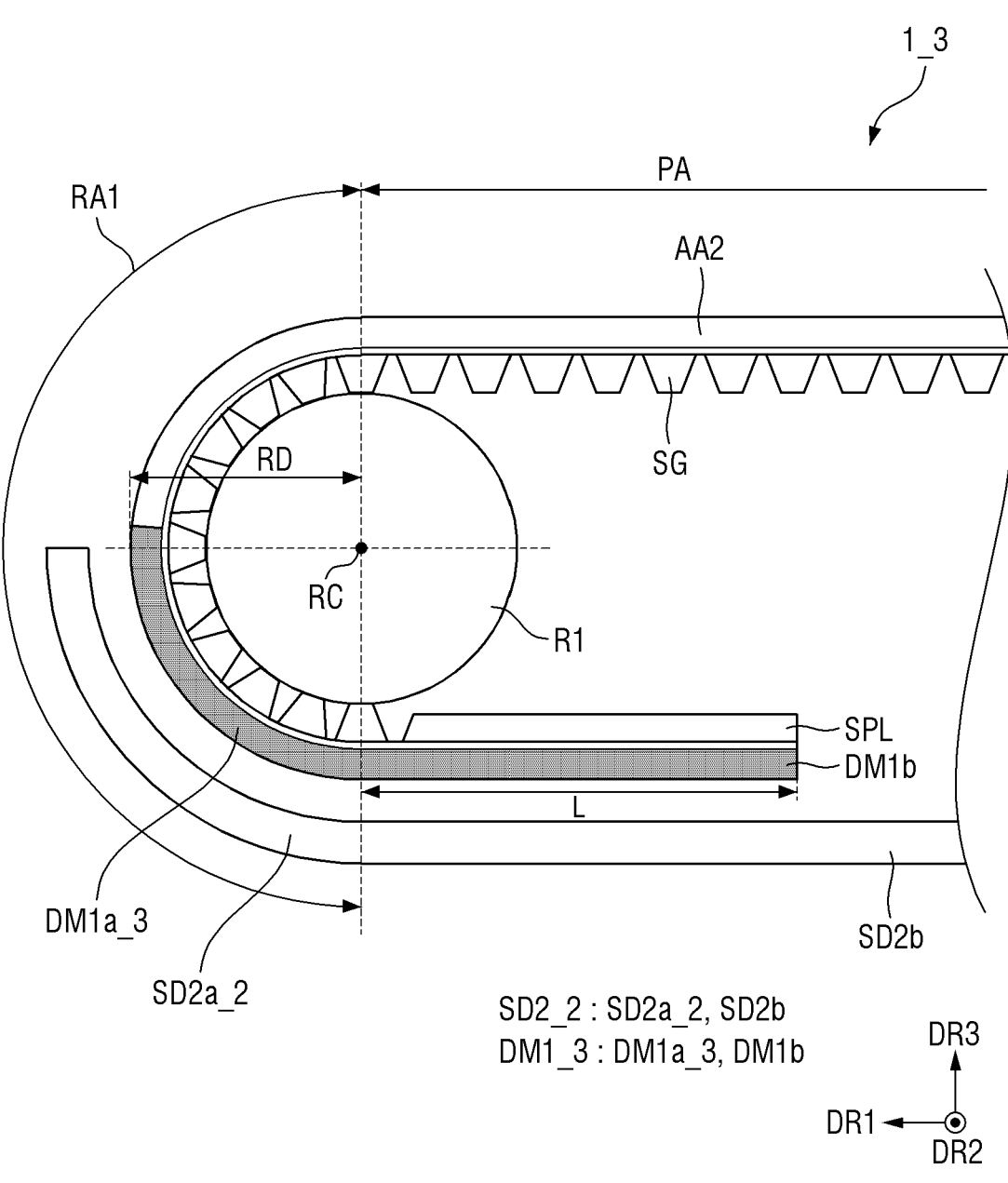
FIG. 11 is a schematic cross-sectional view illustrating an arrangement structure of a storage container and a display panel in a state in which a display device according to another embodiment is expanded to a maximum.

FIG. 11 is a schematic cross-sectional view illustrating an arrangement structure of a storage container and a display panel in a state in which a display device according to another embodiment is expanded to a maximum.

Referring to FIG. 11, a display device 1_3 according to the embodiment may be different from the display device 1_2 of FIG. 10 in that a length of a first dummy bending area DM1*a*_3 of a first dummy area DM1_3 is greater, and other configurations may be substantially the same or similar.

A portion of the first dummy bending area DM1*a*_3 of the display device 1_3 according to the embodiment may be exposed from the cover portion SD2*a*_2 of the second storage container SD2_2 and visually recognized to an outside. A length of the first dummy bending area DM1*a*_3 according to the embodiment may be greater than a value obtained by multiplying a radius of curvature RD (e.g., a predetermined or selectable radius of curvature RD) by a value of π/2.

With such a configuration, since the second active area AA2 of the display device 1_3 according to the embodiment may be further spaced apart from the second storage container SD2_2, a damage to the second active area AA2 by the second active area AA2 contacting the second storage container SD2_2 due to the delamination of the display panel PNL may be effectively prevented or at least alleviated.

The above description is an example of technical features of the disclosure, and those skilled in the art to which the disclosure pertains will be able to make various modifications and variations. Therefore, the embodiments of the disclosure described above may be implemented separately or in combination with each other.

Therefore, the embodiments disclosed in the disclosure are not intended to limit the technical spirit of the disclosure, but to describe the technical spirit of the disclosure, and the scope of the technical spirit of the disclosure is not limited by these embodiments. The protection scope of the disclosure should be interpreted by the following claims, and it should be interpreted that all technical spirits within the equivalent scope are included in the scope of the disclosure.

What is claimed is:

1. A display device comprising:

a display panel including a flat area and a bendable area disposed on a side of the flat area; and a storage container configured to store the bendable area of the display panel, wherein the bendable area includes:

an active area having a side adjacent to the flat area;

a dummy bending area disposed on another side of the active area; and a dummy flat area disposed on a side of the dummy bending area opposite to the active area, the dummy bending area is interposed between the active area and the dummy flat area, the storage container includes a curved support surface having a radius of curvature corresponding a bent portion of the bendable area of the display panel, and a length of the dummy bending area is greater than a length of a portion of which the bendable area is bent.

2. The display device of claim 1, wherein the bendable area is configured to bend about a predetermined axis.

3. The display device of claim 2, wherein in a state in which the display panel has a maximum display area, the portion of which the bendable area is bent includes the dummy bending area.

4. The display device of claim 3, wherein in the state in which the display panel has the maximum display area, the dummy flat area is flat, and a length of the dummy flat area is greater than or equal to about 4 mm.

5. The display device of claim 4, wherein the storage container includes a cover portion covering an entirety of the portion of which the bendable area is bent, and in the state in which the display panel has the maximum display area, at least a portion of the dummy bending area is exposed from the cover portion.

6. The display device of claim 5, wherein the portion of which the bendable area is bent is bent about 180°, and the length of the dummy bending area is equal to or greater than a value obtained by multiplying the radius of curvature by a value of $\pi$.

7. The display device of claim 2, wherein in a state in which the display panel has a maximum display area, the portion of which the bendable area is bent includes a portion of the dummy bending area and a portion of the active area.

8. The display device of claim 7, wherein the storage container includes a cover portion partially exposing the portion of which the bendable area is bent, and in the state in which the display panel has the maximum display area, at least a portion of the dummy bending area is exposed from the cover portion.

9. The display device of claim 8, wherein the portion of which the bendable area is bent is bent about 180°, the cover portion covers about half of the portion of which the bendable area is bent, and the length of the dummy bending area is equal to or greater than a value obtained by multiplying the radius of curvature by a value of $\pi/2$.

10. The display device of claim 9, wherein in the state in which the display panel has the maximum display area, the dummy flat area is flat, and a length of the dummy flat area is greater than or equal to about 4 mm.

* * * * *